United States Patent

Askeland et al.

[11] Patent Number: 6,126,268
[45] Date of Patent: *Oct. 3, 2000

[54] MULTI-CHAMBER INK SUPPLY

[75] Inventors: Ronald A. Askeland, San Diego, Calif.; Mark S. Hickman, Vancouver, Wash.

[73] Assignee: Hewlett-Packard Company, Palo Alto, Calif.

[*] Notice: This patent is subject to a terminal disclaimer.

[21] Appl. No.: 09/069,616

[22] Filed: Apr. 29, 1998

[51] Int. Cl.[7] ........................................................ B41J 2/21
[52] U.S. Cl. .................. 347/43; 347/43; 347/96
[58] Field of Search ................... 347/41, 43, 96, 347/100

[56] References Cited

U.S. PATENT DOCUMENTS

| | | | |
|---|---|---|---|
| 4,438,191 | 3/1984 | Cloutier eta l. | 430/324 |
| 4,694,302 | 9/1987 | Hackleman et al. | 347/96 |
| 4,833,491 | 5/1989 | Rezanka | 347/43 |
| 4,922,265 | 5/1990 | Pan | 347/43 |
| 4,963,189 | 10/1990 | Hindagolla | 106/22 |
| 5,057,852 | 10/1991 | Formica et al. | 347/43 |
| 5,085,698 | 2/1992 | Ma et al. | 106/20 |
| 5,116,409 | 5/1992 | Moffatt | 347/100 |
| 5,181,045 | 1/1993 | Shields et al. | 347/43 |
| 5,198,023 | 3/1993 | Stoffel | 106/22 R |
| 5,371,531 | 12/1994 | Rezanka et al. | 347/43 |
| 5,428,377 | 6/1995 | Stoffel et al. | 347/15 |
| 5,428,383 | 6/1995 | Shields et al. | 347/96 |
| 5,455,610 | 10/1995 | Harrington | 347/43 |
| 5,488,402 | 1/1996 | Shields et al. | 347/96 |
| 5,542,972 | 8/1996 | Von Der Eltz et al. | 347/96 |
| 5,555,008 | 9/1996 | Stoffel et al. | 347/100 |
| 5,621,449 | 4/1997 | Leenders et al. | 347/96 |
| 5,679,143 | 10/1997 | Looman | 106/2 OR |
| 5,976,230 | 5/1989 | Askeland et al. | 106/31.27 |

FOREIGN PATENT DOCUMENTS

| | | |
|---|---|---|
| 0 268 237 | 5/1988 | European Pat. Off. . |
| 0 726 158 | 8/1996 | European Pat. Off. . |

*Primary Examiner*—David F. Yockey
*Assistant Examiner*—Lamson D. Nguyen

[57] ABSTRACT

An ink-jet printing system and ink supply configuration are disclosed that can utilize the advantages of reactive inks while allowing for maximum flexibility in the design and architecture of the ink-jet printing system. The ink-jet printing apparatus comprises a printhead portion having at least three ejector portions; a reservoir portion comprising at least three ink chambers, each ink chamber for providing ink to one of the at least three ejector portions, two of the ink chambers each chamber including one of a first or a second mutually reactive inks and the other ink chamber including an ink non-reactive with the first and second mutually reactive inks.

20 Claims, 5 Drawing Sheets

MULTI-CHAMBER INK SUPPLY

CROSS REFERENCE TO RELATED APPLICATIONS

The present application is related to U.S. application Ser. No. 09/069,717, filed Apr. 29, 1998, entitled "Reactive Ink Set For Ink-Jet Printing," by Askeland et al., assigned to same assignee as the present invention, and filed herewith.

FIELD OF INVENTION

This invention relates to ink-jet printers and the like and, more particularly, to a compact and high print speed ink-jet printing system having enhanced performance.

BACKGROUND OF INVENTION

Ink-jet printing is a non-impact printing process in which droplets of ink are deposited on a print medium in a particular order to form alphanumeric characters, area-fills, and other patterns thereon. Low cost and high quality of the hardcopy output, combined with relatively noise-free operation, have made ink-jet printers a popular alternative to other types of printers used with computers.

The non-impact printing process of ink-jet printing involves the ejection of fine droplets of ink onto a print medium such as paper, transparency film, or textiles in response to electrical signals generated by a microprocessor. There are two basic means currently available for achieving ink droplet ejection in ink-jet printing: thermally and piezo-electrically. In piezoelectric ink-jet printing, the ink droplets are ejected due to the vibrations of piezoelectric crystals, again, in response to electrical signals generated by the microprocessor.

In thermal ink-jet printing, an ink-jet image is formed when a precise pattern of dots is ejected from a drop generating device known as a "printhead" onto a printing medium. The typical ink-jet printhead has an array of precisely formed nozzles (or ejector portions) attached to a thermal ink-jet printhead substrate, such as silicon, nickel, or polyimide, or a combination thereof. The substrate incorporates an array of firing chambers or drop ejector portions that receive liquid ink (colorants dissolved or dispersed in a solvent) through fluid communication with one or more ink reservoir. Each firing chamber has a thin-film resistor, known as a "firing resistor," located opposite the nozzle so ink can collect between the firing resistor and the nozzle. The printhead is mounted on a carriage that travels along the width of the printer (otherwise referred to as the "scan axis").

Commercially-available thermal ink-jet printers, such as DeskJet® printers available from Hewlett-Packard Company, use inks of differing hues, namely, magenta, yellow, and cyan, and optionally black. The particular set of colorants, e.g., dyes, used to make the inks is called a "primary dye set." A spectrum of colors, e.g., secondary colors, can be generated using different combinations of the primary dye set.

One category of ink-jet printers utilizes disposable printheads in which the ink reservoirs are on-board the carriage, thus the term on-board or on-axis. The reservoirs can be formed integrally with the printhead portions or they can be detachably connected thereto.

Another category of ink-jet printers employs ink reservoirs that are not located on the carriage, thus the term off-board or off-axis. In one case, the reservoir intermittently replenishes the printhead with ink when the printhead travels to a stationary reservoir periodically for replenishment. Another type makes use of a replaceable ink reservoir connected to the printhead by a fluid conduit. The printhead is replenished with ink through this fluid conduit.

The reservoirs may be individually (separate from other reservoirs) replaceable or the reservoirs can be formed as one integral reservoir portion, to be replaced as a unit.

Different printhead/ink reservoir configurations address different customer needs. For example, on-board designs provide for ease of use. Printers using the off-board designs provide for less interruptions during printing jobs which require larger ink volumes, such as large format printing.

In general, a successful ink set for color ink-jet printing should have the following properties: good crusting resistance, good stability, the proper viscosity, the proper surface tension, good color-to-color bleed alleviation, rapid dry time, no negative reaction with the vehicle, consumer-safety, and low strike-through. When placed into a thermal ink-jet system, the ink set should also be kogation-resistant.

Regardless of whether an ink is dye-based or pigment-based, ink-jet inks commonly face the challenge of color-to-color or black-to-color bleed control. The term "bleed," as used herein, is defined to be the invasion of one color into another, once the ink is deposited on the print medium, as evidenced by a ragged border therebetween. Bleed occurs as colors mix both on the surface of the paper substrate as well as within the substrate itself. The occurrence of bleed is especially problematic between a black ink and an adjacently-printed color ink because it is all the more visible. Hence, to achieve good print quality, bleed should be substantially reduced or eliminated such that borders between colors are clean and free from the invasion of one color into the other. Several approaches have been utilized in controlling bleed between the printed images, many of which utilize reactive ink mechanisms.

One approach used for controlling bleed between the printed images, as disclosed in U.S. Pat. No. 5,428,383, entitled "Method and Apparatus for Preventing Color Bleed in a Multi-Ink Printing System," filed by Shields et al., and assigned to the same assignee as the present invention, and incorporated herein by reference, is to employ a precipitating agent (e.g., a multi-valent metal salt) in one ink, and a colorant, preferably in the form of an organic dye having at least one and preferably two or more carboxyl and/or carboxylate groups, in another ink, preferably the black ink. When the inks are printed on the printing medium adjacent one another, the ink containing the precipitating agent brings about the precipitation of the colorant with the carboxyl/carboxylate group, thereby preventing the migration of the colorant in the other ink, thereby reducing bleed between the two adjacently printed areas.

Another method of reducing bleed between ink-jet inks involves the use of pH-sensitive dyes as disclosed in U.S. Pat. No. 5,181,045 entitled "Bleed Alleviation Using pH-sensitive Dyes/Inks," filed by Shields et al, and assigned to the same assignee as the present invention, and incorporated herein by reference. It disclosed therein that an ink having a pH-sensitive dye, the "pH-sensitive ink," would be prevented from bleeding into an adjacent ink having an appropriate pH, the "target ink." More particularly, migration of the ink having the pH-sensitive dye is prevented by rendering the dye insoluble on the page by contact with the adjacent ink having the appropriate pH. Thus, bleed is reduced or eliminated by using both the "pH-sensitive" ink as well as the "target" ink. Typically, since the invasion of a black dye into a color ink is more problematic than vice versa because of its greater visibility, the black ink would employ the pH-sensitive dye and the pH of the color ink would be controlled in the practice of the invention, such that the black ink would be prevented from bleeding into the color ink. The method of U.S. Pat. No. 5,181,045 requires a pH differential of about 4 (or even 5) units to completely control bleed.

U.S. application Ser. No. 08/567974, entitled "Bleed Alleviation in Ink-Jet Inks using Organic Acids," filed by Adamic et al. on Dec. 6, 1995, and assigned to the same assignee as the present invention) and U.S. Pat. No. 5,679,143 (entitled "Bleed Alleviation in Ink-jet Inks Using Acids Containing a Basic Functional Group," filed by Looman and assigned to the same assignee as the present invention), both incorporated herein by reference, further disclose methods for controlling bleed by forcing the precipitation of a pH-sensitive dye in one ink (the pH-sensitive ink) on the print medium by contacting the pH-sensitive dye with a second ink (the target ink) having an appropriate pH (either higher or lower than the first ink). Upon contact on the print medium, the pH-sensitive dye of the first ink becomes insoluble, thus bleeding less. U.S. application Ser. No. 08/567974 discloses the use of organic acids to reduce the pH differential required to effect precipitation of a pH-sensitive dye colorant as compared to that disclosed in U.S. Pat. No. 5,181,045, described above. U.S. Pat. No. 5,679,143 employs the use of an organic acid having no basic functional groups and a pH adjusting organic compound containing both acidic and basic functional groups, specifically, at least one acidic functional group and at least one basic functional group, where the number of basic functional groups is the same as or greater than the number of acidic functional groups. The presence of the organic acid in the ink-jet ink composition reduces the pH differential required to render insoluble the pH-sensitive colorant of a second encroaching ink-jet ink composition, as described in U.S. application Ser. No. 08/567974 above. The presence of the dual-function pH adjusting compound further increases the concentration of an acid functional group in the ink-jet ink composition while also increasing the pH of the ink-jet ink composition to acceptable levels. Therefore, the dual-function pH adjusting compound augments the bleed alleviation achieved by an organic acid alone according to the mechanism disclosed in Ser. No. 08/567,974.

In order to prevent the occurrence of bleed between the primary (e.g., cyan, magenta, and yellow) and secondary colors (e.g., red, blue, and green) with black, all the three primary colors are designed to be reactive with the black ink according to reaction mechanisms such as those described above (multi-valent metal salt, pH-sensitive dye).

The above solutions utilizing reactive inks, although of merit, do not maximize flexibility in the design of the inks and printing system in which they are used. For example, using reactive ink systems may lead to unwanted mixing of the reactive inks, hence contributing to reliability problems in the printing system, particularly in compact printhead arrangements or compact ink delivery arrangements.

Therefore, a need exists for an ink-jet printing system and ink supply configuration that can utilize the advantages of reactive inks while allowing for maximum flexibility in the design and architecture of the ink-jet printing system.

DISCLOSURE OF INVENTION

In accordance with the invention, an ink-jet printing system and ink supply configuration are disclosed that can utilize the advantages of reactive inks while allowing for maximum flexibility in the design and architecture of the ink-jet printing system. The ink-jet printing apparatus comprises a printhead portion having at least three ejector portions; a reservoir portion comprising at least three ink chambers, each ink chamber for providing ink to one of the at least three ejector portions, two of the ink chambers each chamber including one of a first or a second mutually reactive inks and the other ink chamber including an ink non-reactive with the first and second mutually reactive inks.

DETAILED DESCRIPTION OF THE INVENTION

DEFINITIONS

Reactive ink—An ink that is reactive with an ingredient in another ink thus providing for enhanced properties, such as, reducing bleed between the reactive ink and the other ink in the event that the reactive ink and the other ink are adjacently printed on a print medium.

Mutually reactive inks—Inks that are reactive with one another.

Non-reactive ink—An ink that is non-reactive with a mutually reactive ink.

Integral Printhead—A printhead having an array of drop ejector portions that are permanently attached to a rigid structure. Ejector portions are fabricted from materials including silicon, nickel, polyimide, or a combination thereof. Such techniques of forming a monolithic printhead are known in the art and are discussed in publication such as U.S. Pat. Nos. 4,438,191 and 4,922,265, both assigned to the assignee of the present invention.

Integral Reservoir Portion—A reservoir portion comprising a plurality of reservoir chambers wherein the plurality of reservoir chambers are permanently affixed with respect to each other.

Integral Print Cartridge—An ink jet printhead portion, and; at least one reservoir chamber, or an integral reservoir portion; forming an integral print cartridge.

On-board (on-axis)—A category of ink-jet printers utilizing disposable printheads in which the ink reservoirs are on-board the carriage. The reservoirs can be formed integrally with the printhead portions or detachably connected thereto.

Off-board (off-axis)—A category of ink-jet printers employing ink reservoirs that are not located on the carriage. In one case, the reservoir intermittently replenishes the printhead with ink when the printhead travels to a stationary reservoir periodically for replenishment. Another type makes use of a replaceable ink reservoir connected to the printhead by a fluid conduit. The printhead is replenished with ink through this fluid conduit.

Scan axis—Axis defined by motion of a carriage associated with the printing system.

DESCRIPTION

Figure 1:
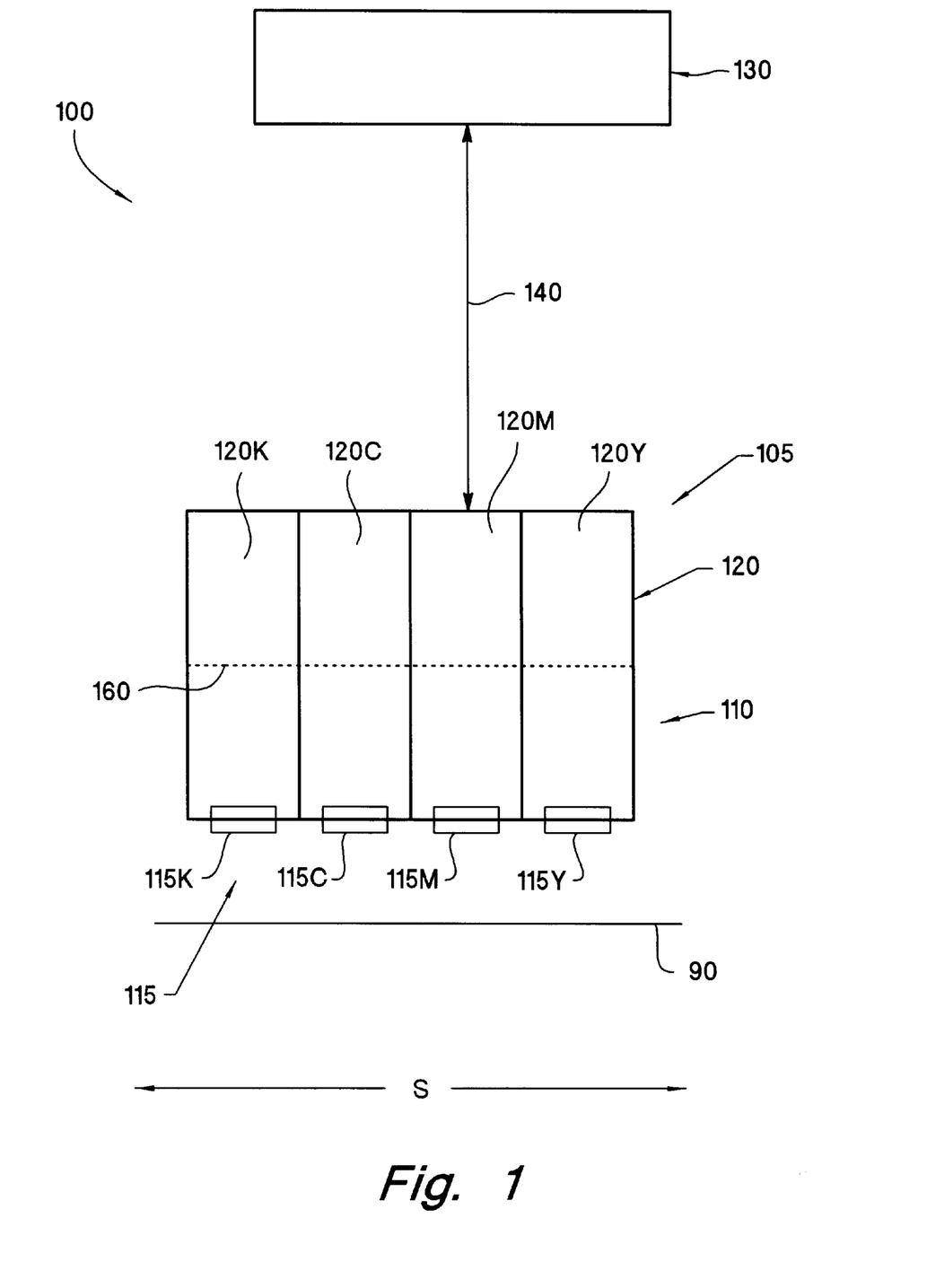
FIG. 1 is an unscaled schematic representation of an ink-jet printing system depicting an ink-jet printhead, ink reservoir, and the control electronics.

Referring now to FIG. 1, set forth therein is an unscaled schematic representation of an ink-jet printing system 100 which includes a multi color ink delivery system 105 of the present invention employing at least two mutually reactive inks for enhancing any one of a number of print system attributes such as bleed alleviation, smearfastness, dry time, or any other desirable attribute. Printing system 100 includes a printhead portion 110 that receives signals from printing system control electronics 130 via electronic link 140 for selectively depositing droplets of ink available from an ink reservoir portion 120 on a printing medium 90 in response.

The printhead 110 comprises a plurality of ejector portions 115 for ejecting different inks. In an exemplary embodiment, the ejector portion 115 comprises ejector portions 115K, 1115C, 115M, and 115Y for ejecting black, cyan, magenta, and yellow inks, respectively. However, more or less inks can be utilized, having different formulations depending on the printing application and degree of print quality and color gamut desired.

In the remainder of the disclosure, by way of example, unless stated otherwise, "bleed" will be used to describe the effects of the reaction between the inks; and, black, cyan, magenta, and yellow will be used to refer to the first through fourth inks.

Each ejector portion receives ink from a separate reservoir chamber. In an exemplary embodiment, the reservoir portion 120 includes reservoir chambers 120K, 120C, 120M, and 120Y for housing black, cyan, magenta, and yellow inks, respectively. The reservoir chambers can be formed integrally with the printhead portion 110 or can be detachably connected to the printhead portion. For example, there may be an optional separation portion 160 between the reservoir portion and the printhead portion. Each reservoir chamber may be individually replaceable. In a preferred embodiment, to simplify the ink delivery system, the reservoir chambers are formed as one integral reservoir portion 120, to be replaced as a unit (i.e., integral reservoir portion).

In a preferred embodiment, the plurality of ejector portions 115, are arranged along an axis to simplify and maximize space efficiency. This axis will be referred to as the array axis "A." To further maximize space efficiency, the array axis "A" is parallel to a scan axis "S" referring to the direction of travel for the printhead portion over the printing medium during a printing operation.

By way of example, FIG. 1, represents an ink-jet printing system employing four different ink chambers 120K, 120C, 120M, and 120Y for housing four different inks, first through fourth inks, respectively, in which at least two of the inks are reactive with one another (otherwise referred to as "mutually reactive inks"), each of said inks comprising an aqueous vehicle, and a colorant. In a preferred embodiment, the mutually reactive inks are contained in an integral reservoir portion. In another preferred embodiment, the mutually reactive inks are utilized in an integral printhead portion. The black ink is reactive with at least the magenta ink or the yellow ink, and preferably, with both the magenta and the yellow inks. More preferably, the cyan ink is non-reactive with the black ink. It should be appreciated by those skilled in the art, that the present invention is not limited to a fixed number of inks and that more or less inks, the inks having same or different colorants, may be used in the ink set.

It is not uncommon for inks to puddle on the nozzle plate of the ink-jet printhead. This puddling, in turn, may lead to the mixing of the inks, for example during the wiping process. This mixing of the inks, especially when reactive inks are used in association with an integral printhead may result in reliability problems in the firing chambers. Therefore, when using reactive ink approaches, such as those described above (or any other reactive approach for that matter), it is preferable to separate the ejector portions associated with the mutually reactive inks. Thus, it is preferred that the mutually reactive inks be separated by at least one ejector portion associated with a non-reactive ink to provide a buffer between the mutually reactive inks. In a preferred embodiment, the first ink is mutually reactive with the third ink, and preferably with both the third and fourth inks; and non-reactive with the second ink. In the preferred embodiment the first, second, third, and fourth, inks are black, cyan, magenta, and yellow.

The reaction between the mutually reactive inks (e.g., first ink and the third and fourth inks) may employ any one of mechanisms well-known in the art such as the use of a pH-sensitive colorant, or the use of a precipitating agent, as described in the aforementioned patents and applications. The present invention can be employed in any reactive system when the first ink is designed to be reactive with the third, and optionally, the fourth inks regardless of the purpose for the reaction. The reaction can serve to enhance any one of a number of print system attributes such as bleed alleviation, smearfastness, dry time, or any other desirable attribute.

Figure 2:
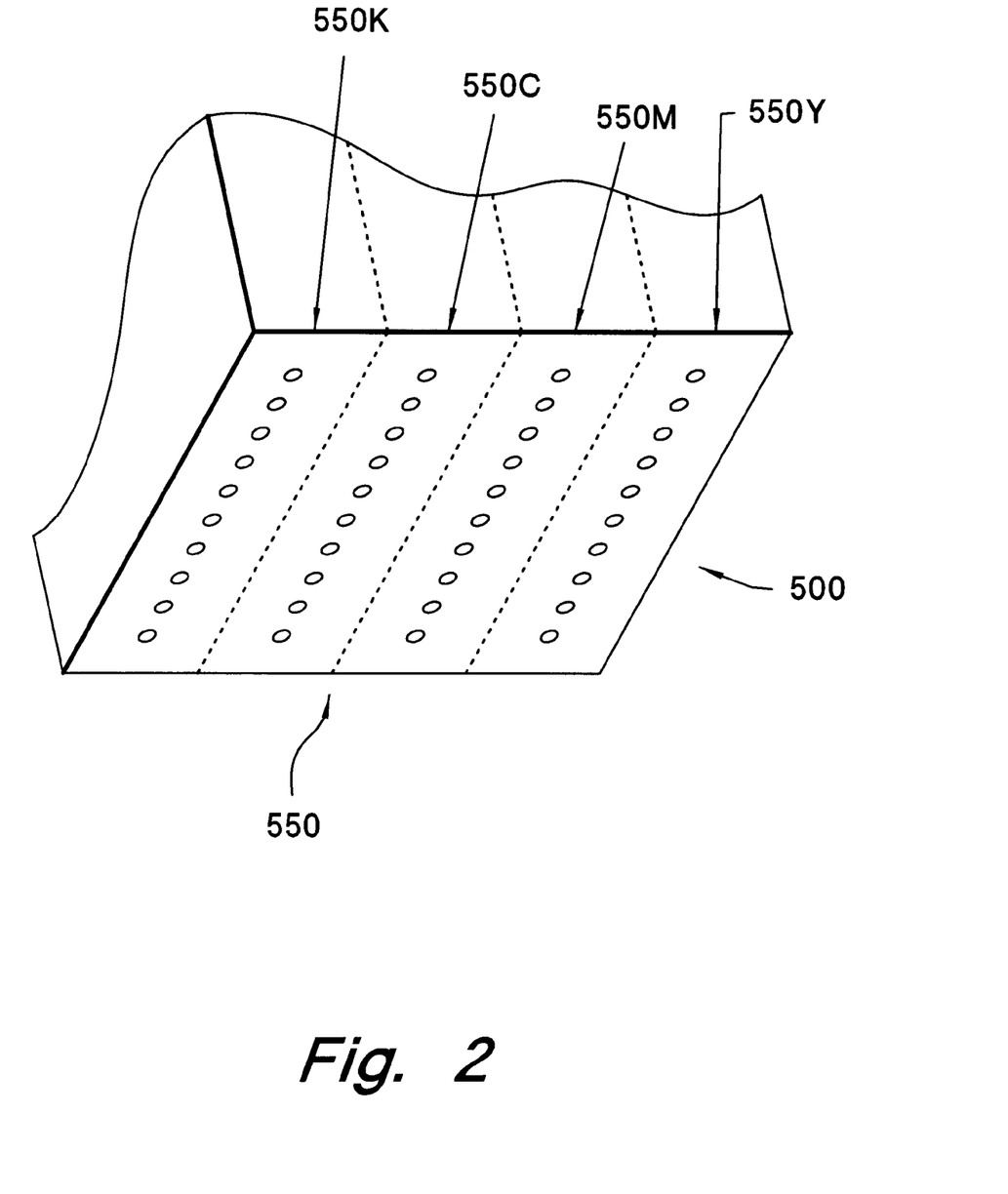
FIG. 2 is an unscaled schematic, partially sectioned, representation of an integral ink-jet printhead.

Referring now to FIG. 2, an integral printhead portion 500 comprising a plurality of ejector portions 550; 550K, 550C, 550M, and 550Y; for ejecting a plurality of inks is shown, broken away, with only the ejector portions illustrated. In a preferred embodiment, the plurality of inks include black, cyan, magenta, and yellow inks. Each ejector portion in printhead portion 500 includes at least one row of nozzles or orifi for ejecting an ink associated with the ejector portion, and preferably arranged along a paper axis "P," perpendicular to the scan axis "S." At least two of the inks, for example, first and third inks, are mutually reactive. In a preferred embodiment, the first ink is black.

Ink sets employing the present invention will reduce bleed between adjacently printed areas where one area is printed with one of the mutually reactive inks (e.g., the first ink) and the other area is printed with the other mutually reactive ink (e.g., at least one of the third or fourth inks). In a preferred embodiment, to minimize reliability problems arising out of possible reaction between inks associated with adjacently positioned ejector portions on an integral printhead, an ink non-reactive (for example the second ink) with the mutually reactive inks, can be employed.

Since the second ink is non-reactive with the first ink there is no bleed control between adjacently printed areas where one area is printed with the first ink and the other area is only printed with the second ink. Therefore, it is preferred that the second ink has a color, preferably cyan, that will exhibit the least objectionable bleed when printed next to the first ink, preferably black.

When using a non-reactive ink (an ink non-reactive with, for example, the black ink), e.g., non-reactive cyan, and reactive magenta and yellow inks (reactive with, for example, the black ink), black-to-color bleed would be alleviated for yellow (reactive), magenta (reactive), red (magenta+yellow), blue (cyan+magenta), and green (yellow+cyan), area-fills adjoining areas printed with the black ink because at least one of the reactive inks (for example, yellow or magenta) would be present in the colored area. However, there would be no bleed control when printing the non-reactive ink, e.g., cyan, next to black. Therefore, it may be desirable to reduce or eliminate the bleed between all colors including the first and second inks. To achieve bleed alleviation between the first and second inks, a printing method is employed (herein referred to as the under-printing method), wherein an area (herein referred to as the first area) to be printed with the first ink (e.g., black) is also, at least partially, printed with at least one ink reactive (e.g., magenta or yellow) with the first ink. The under-printing method provides the necessary immobilization of the colorant of the first ink by virtue of the reaction of an ingredient in the first ink with the an ingredient in or property of the reactive ink such that the colorant of the first ink is prevented from migrating into an adjacent area printed with the non-reactive second ink. Furthermore, the under-printing method may be utilized to enhance other print system attributes such as smearfastness of the first ink.

Figure 3:
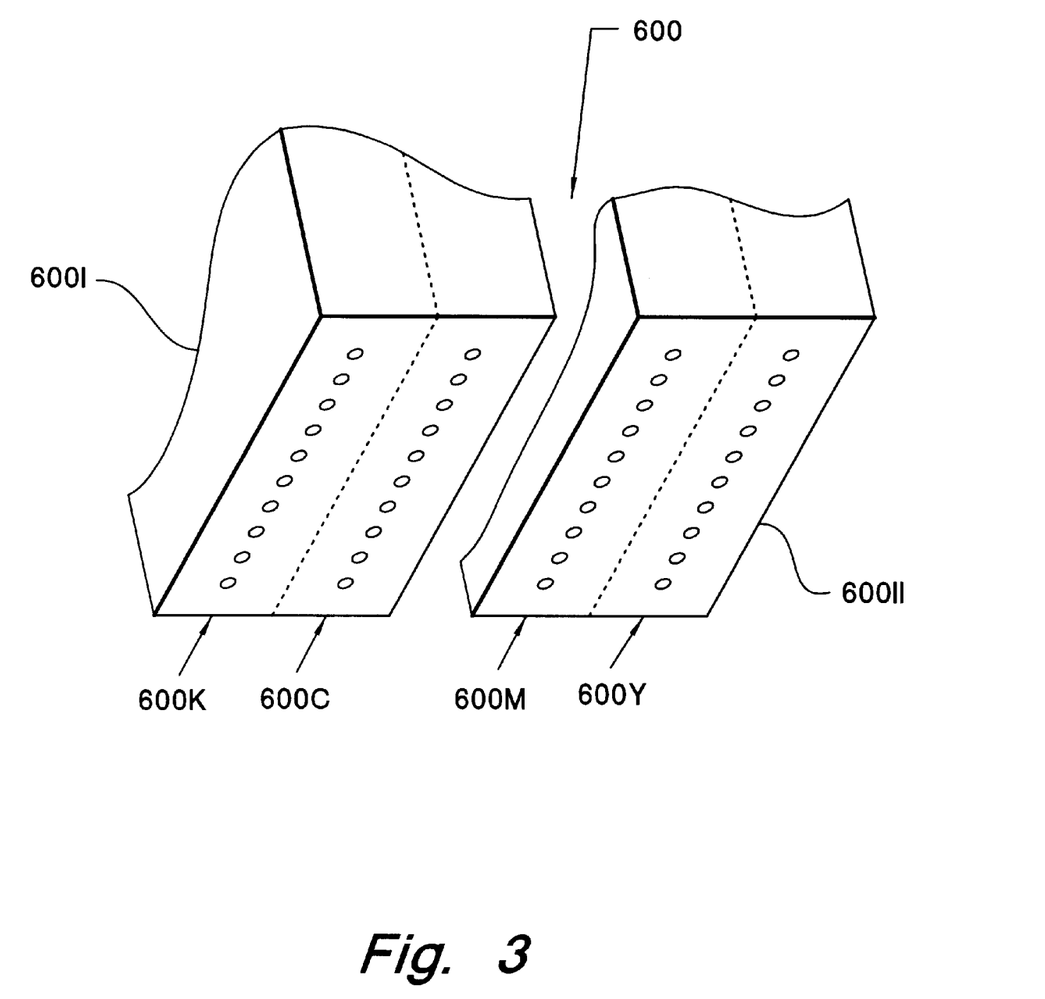
FIG. 3 is an unscaled schematic, partially sectioned, representation of an ink-jet printhead with multiple integral printheads.

Referring now to FIG. 3, printhead portion 600 has been divided into two integral printheads 600I and 600II to further separate the reactive inks. In a preferred embodiment, printhead 600I comprises ejector portions 600K and 600C, and printhead 600II comprises ejector portions 600M and 600Y. As stated above, when the inks are positioned next to one another on the same integral printhead, preferably, the inks associated with the adjacent drop ejector portions are non-reactive with one another. In a preferred embodiment, ejector portions 600K and 600C are associated with black and cyan inks, and ejector portions 600M and 600Y are associate with magenta and yellow inks, wherein the magenta and the yellow inks are reactive with the black ink and the cyan ink is non-reactive with the black ink. Furthermore, as previously described, the under-printing method may be utilized to minimize bleed between adjacent black and cyan printed areas.

Figure 4:
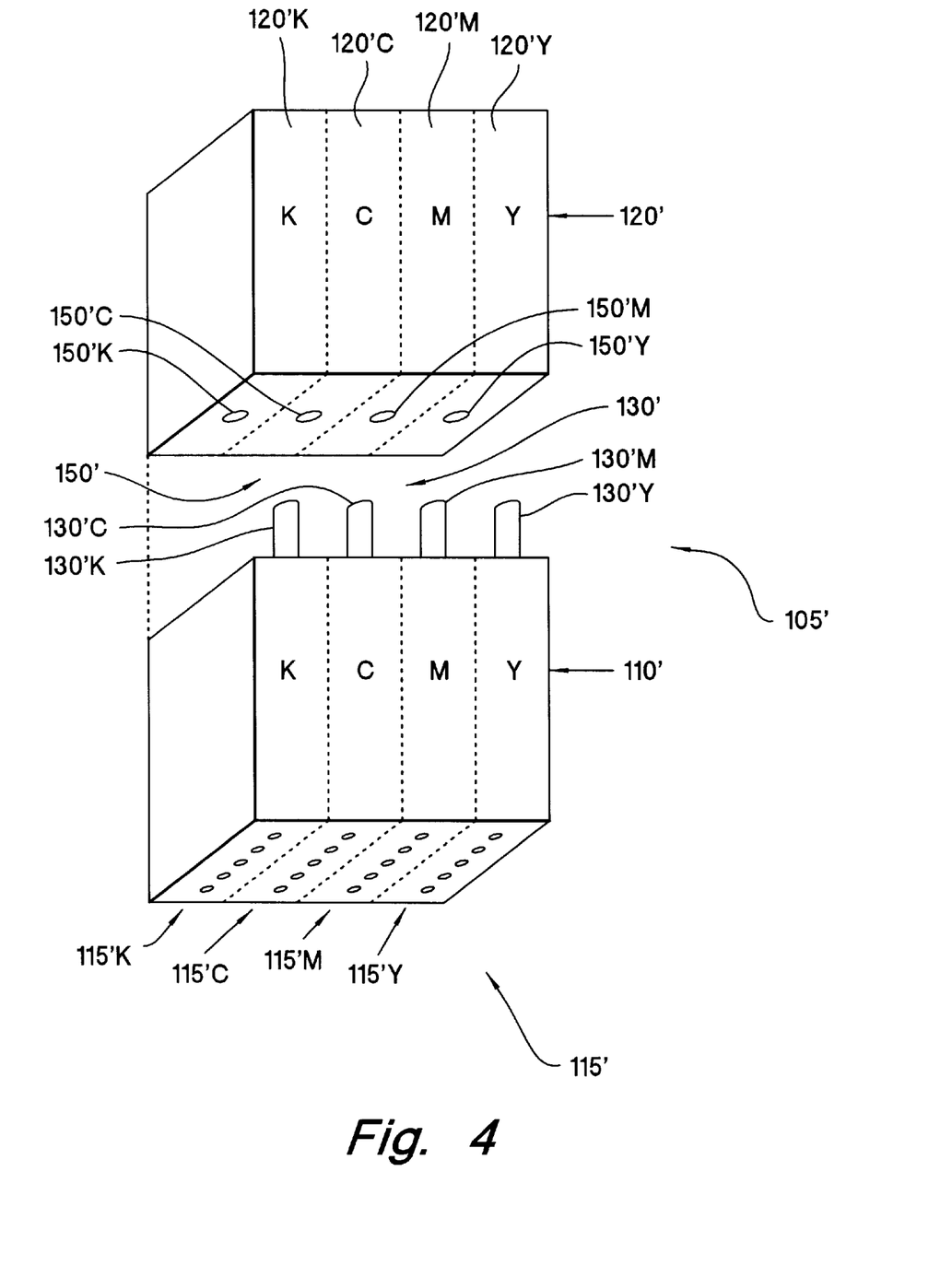
FIG. 4 is an unscaled schematic representation of an on-board ink delivery system where the ink reservoir is separately replaceable from the printhead.

Referring now to FIG. 4, one embodiment of ink delivery system 105' is shown in schematic form. Ink delivery system 105' includes a printhead portion 110' comprising a plurality of ejector portions 115' for ejecting different inks, and a reservoir portion 120' for supplying ink to the printhead portion 110' by way of fluid outlets 150' and fluid inlets 130'. When each fluid outlet 150' is connected to each fluid inlet 130', it forms a fluidic connection that fluidically couples a reservoir chamber having a particular ink with a corresponding ejector portion in a printhead portion utilizing the same ink.

In a preferred embodiments, fluid outlets 150' include 150'K, 150'C, 150'M, and 150'Y, are configured to connect to fluid inlets 130'K, 130'C, 130'M and 130'Y, respectively, hence providing black, cyan, magenta, and yellow inks from their corresponding ink reservoir chambers 120'K, 120'C, 120'M, 120'Y; to ejector portions 115'K, 115'C, 115'M, 115'Y, respectively.

In a preferred embodiment, for compactness of design, fluid outlets 150', fluid inlets 130', reservoir chambers 120', and ejector portions 115' are arranged along an array axis that is preferably parallel to the scan axis "S."

At least two of the inks are mutually reactive. In a preferred embodiment, the first ink is black. Preferably, the first ink is mutually reactive with the third ink, and prefer-ably with both the third and fourth inks; and non-reactive with the second ink. In the preferred embodiment the first, second, third, and fourth, inks are black, cyan, magenta, and yellow. Again, when at least one ink is non-reactive with the first ink, the under-printing method may be utilized.

In a preferred embodiment, the reservoir chambers 120'K, 120'C, 120'M; and 120'Y and their corresponding fluid outlets 150'K, 150'C, 150'M, and 150'Y are positioned along the scan axis "S," in a predetermined positioning order same as that for their corresponding ejector portions 115'K, 115'C, 115'M, 115'Y; and their corresponding fluid inlets 130'K, 130'C, 130'M and 130'Y; respectively. This similar position-ing order, as depicted in FIG. 4, provides for maximum distance between the fluidic connections connecting the mutually reactive inks, hence preventing contamination between mutually reactive inks, particularly in the event of possible leakage in the fluid connections.

Figure 5:
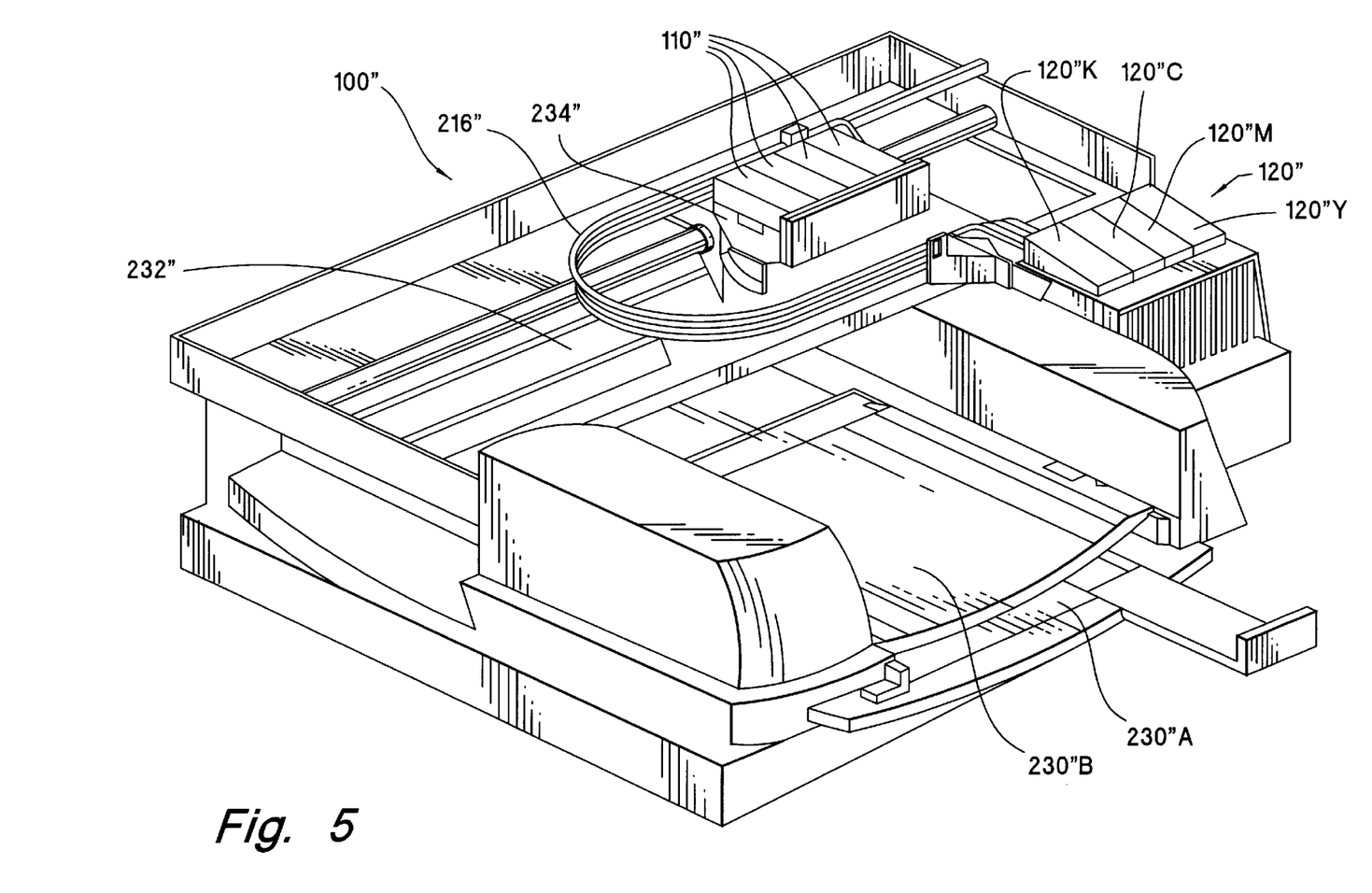
FIG. 5 is an unscaled schematic representation of an off-board ink delivery system where the ink reservoir is connected to the printhead via a fluid conduit.

FIG. 5 depicts a representation of one embodiment of printing system 100". Printing system 100" includes printing medium input 230"A and output 230"B trays for storing printing medium (not shown) both before and after, respectively, the printing medium is fed through a print zone 232". A carriage 234" supports a printhead portion 110" and scans over print zone 232" in a scan direction "S" to allow the ejectors portions (not shown) associated with printhead portions 110" to selectively deposit ink on the printing medium. The printhead portion 110" is fluidically connected to a reservoir portion 120" via conduit 216". The reservoir portion 120" may be placed in a location that scans with the carriage 234" or in a location that does not, to allow for varying carriage configurations. In the embodiment depicted in FIG. 5, printhead portion 110" comprising four ejector portions 115"K, 115"C, 115"M, and 115"Y (not shown); is spaced from the reservoir portion 120" comprising four reservoir chambers 120"K, 120"C, 120"M, and 120"Y; to allow the reservoir portion 120" to be placed in a location that does not scan with carriage 234". Printhead portion 110" receives ink from reservoir portions 120" via conduit 216".

It should be appreciated by those skilled in the art that the number and color of inks in the ink set is not limited to the examples above and that more or less number of inks having the same or different colors may be employed. It should further be appreciated that the designation of first through fourth inks is not limited to black, cyan, magenta, and yellow and also that when a non-reactive subset is used any one of the inks may define the subset. By way of example, the ink set could comprise: black, cyan1, cyan2, magenta1, magent2, and yellow, wherein the designations "1" and "2" refer to inks having the same hue but a different colorant concentrations; or black, cyan, magenta, yellow, red, green, blue, and white to provide a larger color gamut.

INKS

The present ink set comprises at least four inks, each of said inks comprising an aqueous vehicle, and a colorant. In accordance with the invention, at least two of the inks are mutually reactive (e.g., first and third inks). Preferably the ink set comprises at least one ink non-reactive (e.g., second ink) with the at least two mutually reactive inks.

The reaction between the first ink and the inks reactive with it may employ any one of mechanisms well-known in the art such as the use of a pH-sensitive colorant, or the use of a precipitating agent, as described in the aforementioned patents and applications. The present invention can be employed in any reactive system when at least two of the inks are mutually reactive regardless of the purpose for the reaction. The reaction can serve to enhance any one of a number of print system attributes such as bleed alleviation, smearfastness, dry time, or any other desirable attribute. For illustrative purposes, bleed and its corresponding control reaction mechanisms will be used in further describing the invention.

The colorants may be dye-based or pigment-based. As used herein, the term "pigment" refers to a colorant that is insoluble in the aqueous vehicle, and includes disperse dyes.

COLORANTS

The colorants employed in the inks may be either dye or pigment-based. The choice of colorants is dependent upon the particular printing application. As in the case of the colorant for the first ink, the choice of colorant further depends on the reaction mechanism of choice, for example—use of pH sensitive colorant, or the use of a precipitating agent (e.g., multi-valent metal salt), or any other suitable reaction mechanism.

Examples of suitable colorants used in the first ink include organic dyes having at least one and preferably two or more carboxyl and/or carboxylate groups examples of which are listed in U.S. Pat. No. 4,963,189 (filed by Hindagolla and assigned to the same assignee as the present invention, and incorporated herein by reference), and carboxylated pigment dispersions having a water insoluble colorant (e.g., pigment) dispersed with a dispersant preferably containing carboxylate solubilizing groups, such as those disclosed in U.S. Pat. No. 5,085,698, and U.S. Pat. No. 5,555,008, both incorporated herein by reference.

Colorants for use in the other inks, i.e., second, third, and fourth inks, are well-known in the art, and for example, as described in the aforementioned patents and applications.

AQUEOUS VEHICLE

The aqueous vehicle is water or a mixture of water and at least one water-soluble organic solvent, as is well-known in the art. Selection of a suitable mixture depends on requirements of the specific application, such as the desired surface tension and viscosity, the selected colorant, drying time of the ink-jet ink, and the type of print medium onto which the ink will be printed. The inks may further comprise additional ingredients such as biocides, surfactants, and the like, each of which are commonly employed additives in ink-jet printing.

Depending on the reaction mechanism, the reactive inks may have additional ingredients. For example, when the reaction mechanism for reducing bleed is by precipitation of a pH-sensitive colorant in the first ink, the reactive third and fourth inks comprise an organic acid in sufficient amount to render the pH-sensitive colorant of the first ink insoluble upon contact, as disclosed in U.S. Pat. No. 5,679,143 and U.S. application Ser. No. 08/567974, mentioned above.

Alternatively, when the reaction mechanism is based on the use of a precipitating agent, such as multi-valent metal salts, as disclosed in the aforementioned patents, the third and fourth inks contain a precipitating agent, e.g., multi-valent metal salt.

PRINTING METHOD

As stated above, when the ink set includes an ink non-reactive with the first ink, a printing method (the underprinting method) may be employed to reduce bleed between the first ink and the non-reactive ink or to enhance other print system attributes. In applying the method, an area (herein referred to as the first area) to be printed with the first ink (e.g., black) is also, at least partially, printed with at least one ink reactive (e.g., magenta or yellow) with the first ink, thereby minimizing the mixing of colors between the first area and a second area to be printed with the non-reactive ink.

The printing method used to alleviate bleed between the first ink and the non-reactive ink using the ink set and the printing system of the present invention comprises printing from an ink-jet printhead, the method comprising the steps:

providing an ink-jet ink set comprising inks, the inks comprising an aqueous vehicle and a colorant, the ink set comprising:
at least two mutually reactive inks, the at least two mutually reactive inks comprising a first and a second mutually reactive inks;
an ink non-reactive with the at least two mutually reactive inks;

selecting a first predetermined area on a print medium;

printing at least one drop of one of the mutually reactive inks on the first predetermined print area;

printing at least one drop of the other mutually reactive ink on the first print area such that the at least one drop of the other mutually reactive ink at least partially overlaps with the at least one drop of the one mutually reactive ink, thereby immobilizing the at least one drop of the first mutually reactive ink on the print medium;

selecting a second predetermined print area on the print medium adjacent the first print area; and printing at least one drop of the non-reactive ink on the second predetermined print area;

thereby minimizing the mixing of the at least one drop of the first mutually reactive ink with the at least one drop of the non-reactive ink on the print medium, thereby reducing bleed between the at least one drop of the first mutually reactive ink and the at least one drop of the non-reactive ink.

It should be appreciated by those skilled in the art, that the immobilization of the colorant of the first ink may take place regardless of the order in which droplets of the first ink and the ink reactive with the first ink are deposited on the print medium. For example, black may be deposited first followed by the magenta or the magenta may be deposited first followed by the black. Similarly, the non-reactive ink may be deposited in any order in relation with the order of drop deposit for the mutually reactive inks, as long as the colorant of the first ink is immobilized by the third ink. For example, cyan may be deposited in the second area, followed by magenta and thereafter black in the first area; or the magenta and black may be deposited in the first area first followed by cyan being deposited in the second area.

INDUSTRIAL APPLICABILITY

The present ink-jet printing apparatus and ink delivery apparatus are expected to find commercial use in ink-jet printing.

Thus, there has been disclosed an ink-jet printing apparatus and an ink delivery apparatus. It will be readily apparent to those skilled in the art that various changes and modifications of an obvious nature may be made without departing from the spirit of the invention, and all such changes and modifications are considered to fall within the scope of the invention as defined by the appended claims.

What is claimed is:

1. An ink-jet printing apparatus, comprising:

a printhead portion having at least three ejector portions;

a reservoir portion comprising at least three ink chambers, each ink chamber for providing ink to one of the at least three ejector portions, two of the ink chambers each chamber including one of a first mutually reactive ink and a second mutually reactive ink, and the other ink chamber including an ink non-reactive with the first and second mutually reactive inks.

2. The apparatus of claim 1 wherein the printhead portion and the reservoir portion form an integral print cartridge.

3. The apparatus of claim 1 wherein the reservoir portion is adapted to be releasably mounted to the printhead portion.

4. The apparatus of claim 1 wherein the printhead portion includes at least three fluid inlets, and the reservoir portion includes at least three corresponding fluid outlets configured for connection to the three fluid inlets.

5. The apparatus of claim 1 wherein the ejector portion for ejecting the non-reactive ink is positioned between the two ejector portions for the first and second mutually reactive inks.

6. The apparatus of claim 5 further comprising a fourth ink reactive with the first mutually reactive ink.

7. The apparatus of claim 1 further comprising a scanning carriage that supports the printhead portion and provides relative motion between the printhead portion and a print media.

8. An ink delivery apparatus for providing ink to an ink-jet printing system, the ink delivery apparatus comprising:

an integral reservoir portion having a plurality of ink chambers containing a plurality of inks including at least two mutually reactive inks and an ink non-reactive to said at least two mutually reactive inks.

9. The apparatus of claim 8 wherein the reservoir portion includes at least three fluid outlets for providing the at least two mutually reactive inks and the non-reactive ink to three fluid inlets associated with the printing system, the fluid outlets providing the mutually reactive inks are separated by the fluid outlet providing the non-reactive ink, thereby minimizing the mixing of the mutually reactive inks.

10. The apparatus of claim 8 wherein the printing system includes a printhead portion, and wherein the integral reservoir portion is adapted to be releasably mountable to the printhead portion to make the mutually reactive inks available to the printhead portion.

11. An ink delivery apparatus, comprising:

a plurality of ink chambers containing a plurality of inks, the plurality of inks including two mutually reactive inks and an ink non-reactive with the at least two mutually reactive inks.

12. The apparatus of claim 11 wherein the plurality of ink chambers form an integral reservoir portion.

13. The apparatus of claim 11 wherein one of the mutually reactive inks is black.

14. The apparatus of claim 13 wherein the other mutually reactive inks is magenta or yellow.

15. The apparatus of claim 13 wherein the non-reactive ink is cyan.

16. The apparatus of claim 11 further comprising a fourth ink reactive with one of the two mutually reactive inks.

17. The apparatus of claim 16 wherein the two mutually reactive inks are black and magenta, the non-reactive ink is cyan, and the fourth ink is yellow, and wherein the fourth ink is reactive with black and non-reactive with magenta.

18. An ink delivery apparatus for an ink-jet printing system, the ink delivery apparatus comprising:

a plurality of ink chambers for providing ink to an integral ink-jet printhead portion, each ink chamber containing one of a plurality of inks to be provided to one of a plurality of corresponding ejector portions associated with the integral printhead portion, the plurality of the inks including at least two mutually reactive inks and an ink non-reactive to said at least two mutually reactive inks.

19. The apparatus of claim 18 wherein the ejector portions for ejecting the non-reactive ink are positioned between the two ejector portions for ejecting the at least two mutually reactive inks.

20. The apparatus of claim 18 wherein the plurality of ink chambers include at least three fluid outlets for providing the at least two mutually reactive inks and the non-reactive ink to three fluid inlets associated with the printing system, the fluid outlets providing the mutually reactive inks are separated by the fluid outlet providing the non-reactive ink, thereby minimizing the mixing of the mutually reactive inks.

* * * * *